S. O. WHITE.
STEERING WHEEL.
APPLICATION FILED NOV. 16, 1916.
1,259,182. Patented Mar. 12, 1918.
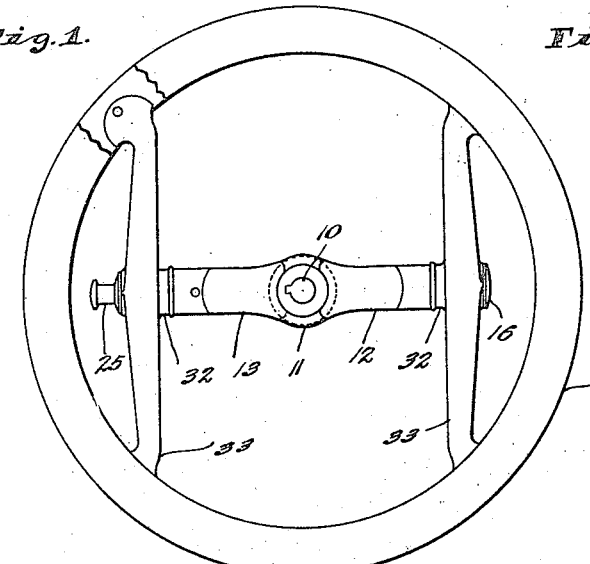
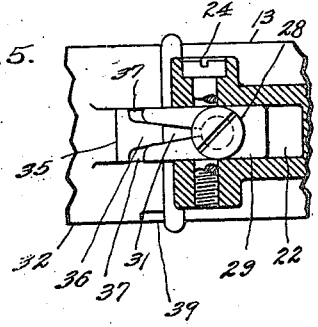
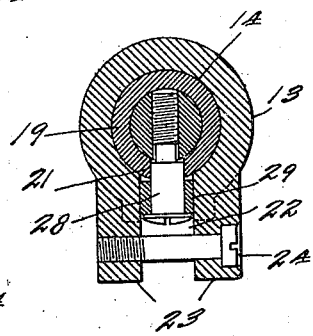
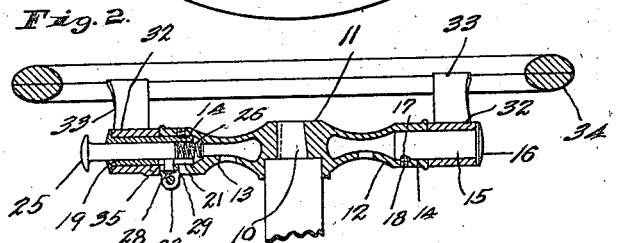
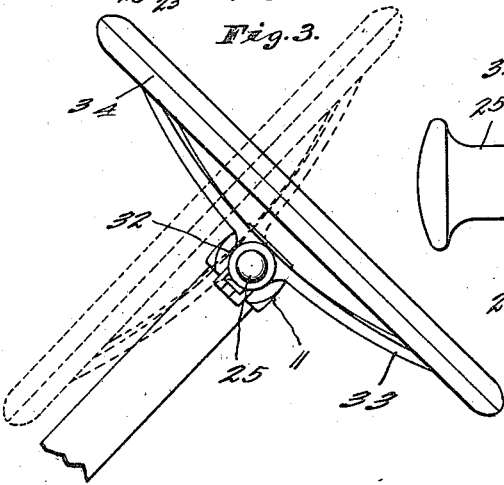
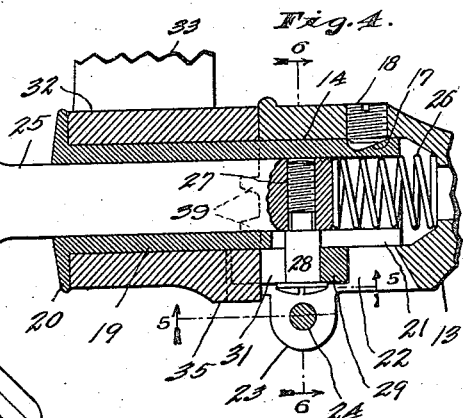
WITNESSES:
Frank A. Sable
Josephine Gasper
INVENTOR
Samuel O. White,
BY
Hood & Schley
ATTORNEYS

UNITED STATES PATENT OFFICE.

SAMUEL O. WHITE, OF MUNCIE, INDIANA, ASSIGNOR TO WARNER GEAR COMPANY, OF MUNCIE, INDIANA, A CORPORATION OF INDIANA.

STEERING-WHEEL.

1,259,182. Specification of Letters Patent. Patented Mar. 12, 1918.

Application filed November 16, 1916. Serial No. 131,620.

*To all whom it may concern:*

Be it known that I, SAMUEL O. WHITE, a citizen of the United States, residing at Muncie, in the county of Delaware and State of Indiana, have invented a new and useful Steering-Wheel, of which the following is a specification.

The object of my invention is to produce improvements in details of construction of a tiltable steering wheel for automobiles, to eliminate the tendency, in such devices, to rattle, or have a slight play, under the hands of the operator, the arrangement being such that the parts may be readily produced by ordinary methods of manufacture.

The accompanying drawings illustrate my invention. Figure 1 is a plan of the steering wheel and supporting head, with a small portion of the steering wheel rim broken away; Fig. 2 an axial section; Fig. 3 a side elevation; Fig. 4 a section, in the same plane as the section of Fig. 2, but on a larger scale, of the latch and associated parts; Fig. 5 a section on line 5—5 of Fig. 4; and Fig. 6 a section on line 6—6 of Fig. 4.

In the drawings, 10 indicates the steering shaft of ordinary form, to which is attached a cross head 11, provided with oppositely extending hollow arms 12 and 13, each of which at its outer end is provided with a socket 14. In the socket 14 of arm 12 is mounted a pin 15, provided at its outer end with a head 16, and at its inner end with an inclined notch 17, adapted to receive the set screw 18, said set screw serving to give a slight axial adjustment of the pin 15.

Mounted in socket 14 of arm 13 is a hollow pin 19, provided with a head 20 and a notch 17. The hollow pin 19 at its inner end is slotted at 21, and the arm 13, at one side of its socket 14, is slotted at 22 and provided with opposed ears 23, which may be clamped together by means of a screw 24, the arrangement being such that by setting up screw 24, any wear of the bore of pin 19 may be compensated, such adjustment also compensating corresponding wear of slots 21 and 22.

Slidably mounted in the bore of pin 19 is a plunger 25 which abuts a fairly strong spring 26 mounted within pocket 14 and the inner end of the bore of pin 19, and normally urging plunger 25 outwardly.

At its inner end, plunger 25 is provided with a transverse threaded perforation 27, adapted to receive the threaded end of a pin 28, the main shank of which slidingly fits slot 21, and passes through the latch piece 29, the head of pin 28 holding said latch piece in place.

The latch piece 28 is especially formed to prevent rattling of the steering wheel. Transversely it neatly fits slot 22, and at one end is provided with a V-shaped notch 31 which extends into the perforation through which the shank of pin 28 passes, thus forming two fingers having parallel outer faces and converging inner faces.

Pivoted upon pins 15 and 19 are brackets or hubs 32 provided with oppositely extending arms 33, which support the rim 34 of the steering wheel. That hub which is journaled upon pin 19 is provided at one point with a thickened portion 35 which is formed into a tapered tooth 36, adapted to enter notch 31, said tooth being flanked with notches 37, into which the fingers of latch piece 29 may project, said notches 37 having parallel outer faces and diverging inner faces corresponding to the fingers of latch piece 29. The tooth 36 is so placed that when latch piece 29 engages the same, the steering wheel will be held in the position shown in full lines in Fig. 3. The hub which carries tooth 36 is also provided with a pair of notches 39 (dotted lines, Fig. 4) adapted to receive the fingers of latch piece 29 and retain the steering wheel in the position indicated by dotted lines in Fig. 3.

Notches 31, 37 and 39, as well as slots 21 and 22, may be readily formed by common machine tools to a reasonable degree of accuracy, without more than ordinary care, but such degree of accuracy would not result in sufficient tightness of the parts to prevent rattling, but in view of the extension of notch 21, and the coöperation of the tapered fingers of the latch piece with the tooth 36 and the flanking tapered notches 37, spring 26 will serve to crowd the fingers of the latch piece tightly into the notches 37 and over the tooth 36, and thus firmly hold the steering wheel in active position, so as to prevent rattling.

An adjustment of the clamping screw 24 will serve to take up any wear between the latch piece and slot 22, and the clamping screw also strengthens the slotted outer end of arm 13.

Adjustment of the set screws 18 insures against any sidewise movement of the steering wheel axially of the pins 15 and 19.

I claim as my invention:

1. A steering wheel for automobiles comprising a cross head designed for attachment to a steering shaft, one end of said cross head being bored and axially slotted, a hollow pin mounted within said bored end of the cross head and having an axial slot registering with the slot of the head, a plunger mounted in said hollow pin, a spring backing for said plunger, a latch piece slidably fitted in the slot of the cross head and having a pair of mating tapered fingers forming a crotch in the line of action of the plunger, a connection between said latch piece and the plunger through the slot of the hollow pin, and a steering wheel having a bracket journaled on the hollow pin, said journaled portion having adjacent tapered notches formed to receive the tapered fingers of the latch piece.

2. A steering wheel for automobiles comprising a cross head designed for atatchment to a steering shaft, one end of said cross head being bored, axially slotted, and provided with a transverse clamping member, a hollow pin mounted within said bored end of the cross head and having an axial slot registering with the slot of the head, a plunger mounted in said hollow pin, a spring backing for said plunger, a latch piece slidably fitted in the slot of the cross head and having a pair of mating tapered fingers forming a crotch in the line of action of the plunger, a connection between said latch piece and the plunger through the slot of the hollow pin, and a steering wheel having a bracket journaled on the hollow pin, said journaled portion having adjacent tapered notches formed to receive the tapered fingers of the latch piece.

In witness whereof, I have hereunto set my hand at Muncie, Indiana, this tenth day of November, A. D. one thousand nine hundred and sixteen.

SAMUEL O. WHITE.

Copies of this patent may be obtained for five cents each, by addressing the "Commissioner of Patents, Washington, D. C."